US011805076B2

(12) United States Patent
Vadayadiyil Raveendran et al.

(10) Patent No.: US 11,805,076 B2
(45) Date of Patent: Oct. 31, 2023

(54) MICROSERVICE PLACEMENT IN HYBRID MULTI-CLOUD USING GRAPH MATCHING

(71) Applicant: KYNDRYL, INC., New York, NY (US)

(72) Inventors: Pramod Vadayadiyil Raveendran, Bangalore (IN); Kuntal Dey, New Delhi (IN); Seema Nagar, Bangalore (IN); Sougata Mukherjea, New Delhi (IN)

(73) Assignee: KYNDRYL, INC., New York, NY (US)

( * ) Notice: Subject to any disclaimer, the term of this patent is extended or adjusted under 35 U.S.C. 154(b) by 232 days.

(21) Appl. No.: 16/999,134

(22) Filed: Aug. 21, 2020

(65) Prior Publication Data
US 2022/0060431 A1  Feb. 24, 2022

(51) Int. Cl.
*H04L 47/70* (2022.01)
*H04L 41/12* (2022.01)
(Continued)

(52) U.S. Cl.
CPC ............ *H04L 47/822* (2013.01); *H04L 41/12* (2013.01); *H04L 41/147* (2013.01); *H04L 43/0852* (2013.01); *H04L 47/829* (2013.01)

(58) Field of Classification Search
None
See application file for complete search history.

(56) References Cited

U.S. PATENT DOCUMENTS 7,693,983 B1  4/2010 Gupta et al.
8,762,538 B2  6/2014 Dutta et al.
(Continued)

FOREIGN PATENT DOCUMENTS

CN  105933448 A  9/2016
CN  108701182    10/2018
(Continued)

OTHER PUBLICATIONS

"Hassan Hawilo ,Manar Jammal, and Abdallah Shami, Network Function Virtualization-Aware Orchestrator for Service Function Chaining Placement in the Cloud, Mar. 2019, IEEE, IEEE Journal on Selected Areas in Communications, 643-655" (Year: 2019).*
(Continued)

*Primary Examiner* — Derrick W Ferris
*Assistant Examiner* — Keith Follansbee
(74) *Attorney, Agent, or Firm* — Dan Housley; Andrew M. Calderon; Calderon Safran & Cole, P.C.

(57) ABSTRACT

An embodiment of the invention may include a method, computer program product and system for deployment of microservices within a shared pool of configurable computing resources. An embodiment may include creating a dependency map for a plurality of microservices of an application deployed on the shared pool of configurable computing resources. An embodiment may include identifying attributes, with associated values, for each microservice of the plurality of microservices and identifying eligible deployment locations within the shared pool of configurable computing resources. An embodiment may include creating a bipartite graph based on the plurality of microservices and the identified eligible deployment locations. An embodiment may include applying bipartite matching to the shared pool of configurable computing resources based on the created bipartite graph. An embodiment may include, based on the applied bipartite matching, relocating one or more microservices within the shared pool of configurable computing resources.

20 Claims, 5 Drawing Sheets

(51) Int. Cl.
H04L 43/0852 (2022.01)
H04L 41/147 (2022.01)

(56) References Cited

U.S. PATENT DOCUMENTS

| | | | |
|---|---|---|---|
| 8,914,515 | B2 | 12/2014 | Alapati et al. |
| 9,195,509 | B2 | 11/2015 | Bartfai-Walcott et al. |
| 9,461,969 | B2 | 10/2016 | Watt |
| 9,495,139 | B2 | 11/2016 | Stitt et al. |
| 2011/0264482 | A1* | 10/2011 | Rahmouni ....... G06Q 10/06316 705/348 |
| 2015/0046384 | A1* | 2/2015 | Eck ................. G06N 5/04 706/46 |
| 2017/0364811 | A1 | 12/2017 | Malecki et al. |
| 2018/0063143 | A1 | 3/2018 | Wilson et al. |
| 2018/0331905 | A1 | 11/2018 | Toledo et al. |
| 2018/0357045 | A1 | 12/2018 | Hollands |
| 2019/0102157 | A1* | 4/2019 | Caldato ............... G06F 9/547 |
| 2020/0226013 | A1 | 7/2020 | Caldato et al. |

FOREIGN PATENT DOCUMENTS

| | | |
|---|---|---|
| CN | 110692037 | 1/2020 |
| CN | 111279309 | 6/2020 |
| WO | 2018197928 | 11/2018 |

OTHER PUBLICATIONS

Sampaio Jr., "Runtime Adaptation of Microservices", Ph.D. Thesis in partial fulfillment of the requirements for the degree of Doctor of Philosophy on Graduated Studies in Computer Science of Centre of Informatics, Federal University of Pernambuco, Sep. 11, 2018, 137 pages (Year: 2018).*

International Search Report and Written Option of the International Searching Authority from PCT Application No. PCT/CN2021/101266 dated Sep. 22, 2021, 10 pages.

Mell et al., "The NIST Definition of Cloud Computing", Recommendations of the National Institute of Standards and Technology, NIST Special Publication 800-145, Sep. 2011, 7 pages.

Sampaio Jr., "Runtime Adaptation of Microservices", Ph.D. Thesis in partial fulfillment of the requirements for the degree of Doctor of Philosophy on Graduated Studies in Computer Science of Centre of Informatics, Federal University of Pernambuco, Sep. 11, 2018, 137 pages.

Hu et al., "Optimizing Service Placement for Microservice Architecture in Clouds", Applied Sciences Article, Nov. 1, 2019, 18 pages.

Sampaio Jr. et al., "Improving microservice-based applications with runtime placement adaptation", Journal of Internet Services and Applications, (2019), 10:4, pp. 1-30.

Selimi et al., "Practical Service Placement Approach for Microservices Architecture", 2017 17th IEEE/ACM International Symposium on Cluster, Cloud and Grid Computing, pp. 401-410.

Stevant et al., "Optimizing the performance of a microservice-based application deployed on user-provided devices", 2018 17th International Symposium on Parallel and Distributed Computing, pp. 133-140.

Unuvar et al., "Hybrid Cloud Placement Algorithm", 2014 IEEE 22nd International Symposium on Modelling, Analysis & Simulation of Computer and Telecommunication Systems, pp. 197-206.

* cited by examiner

MICROSERVICE PLACEMENT IN HYBRID MULTI-CLOUD USING GRAPH MATCHING

BACKGROUND

Embodiments of the present invention relate generally to the field of cloud computing, and more specifically, to identifying optimal locations for microservices in a hybrid multi-cloud environment based on graph matching.

Cloud computing is the delivery of on-demand computing resources, especially data storage and computing power, over the internet without direct active management by the user. The term is generally used to describe data centers available to many users over the internet on a pay-for-use basis. As an increasing number of software applications are moving to the cloud and are being developed for the cloud (i.e., cloud native applications), enterprises are adopting a variety of cloud deployment models. These range from private clouds, to public clouds, to a mix of both (i.e., hybrid clouds). Microservices architectures, which are commonly adopted for cloud-native applications, are an architectural approach in which a single software application is composed of many loosely coupled and independently deployable smaller components, or services.

BRIEF SUMMARY

An embodiment of the invention may include a method, computer program product and system for deployment of microservices within a shared pool of configurable computing resources. An embodiment may include creating a dependency map for a plurality of microservices of an application deployed on the shared pool of configurable computing resources. An embodiment may include identifying attributes, with associated values, for each microservice of the plurality of microservices and identifying eligible deployment locations within the shared pool of configurable computing resources. An embodiment may include creating a bipartite graph based on the plurality of microservices and the identified eligible deployment locations. An embodiment may include applying bipartite matching to the shared pool of configurable computing resources based on the created bipartite graph. An embodiment may include, based on the applied bipartite matching, relocating one or more microservices, of the plurality of microservices, within the shared pool of configurable computing resources.

DETAILED DESCRIPTION

Figure 1:
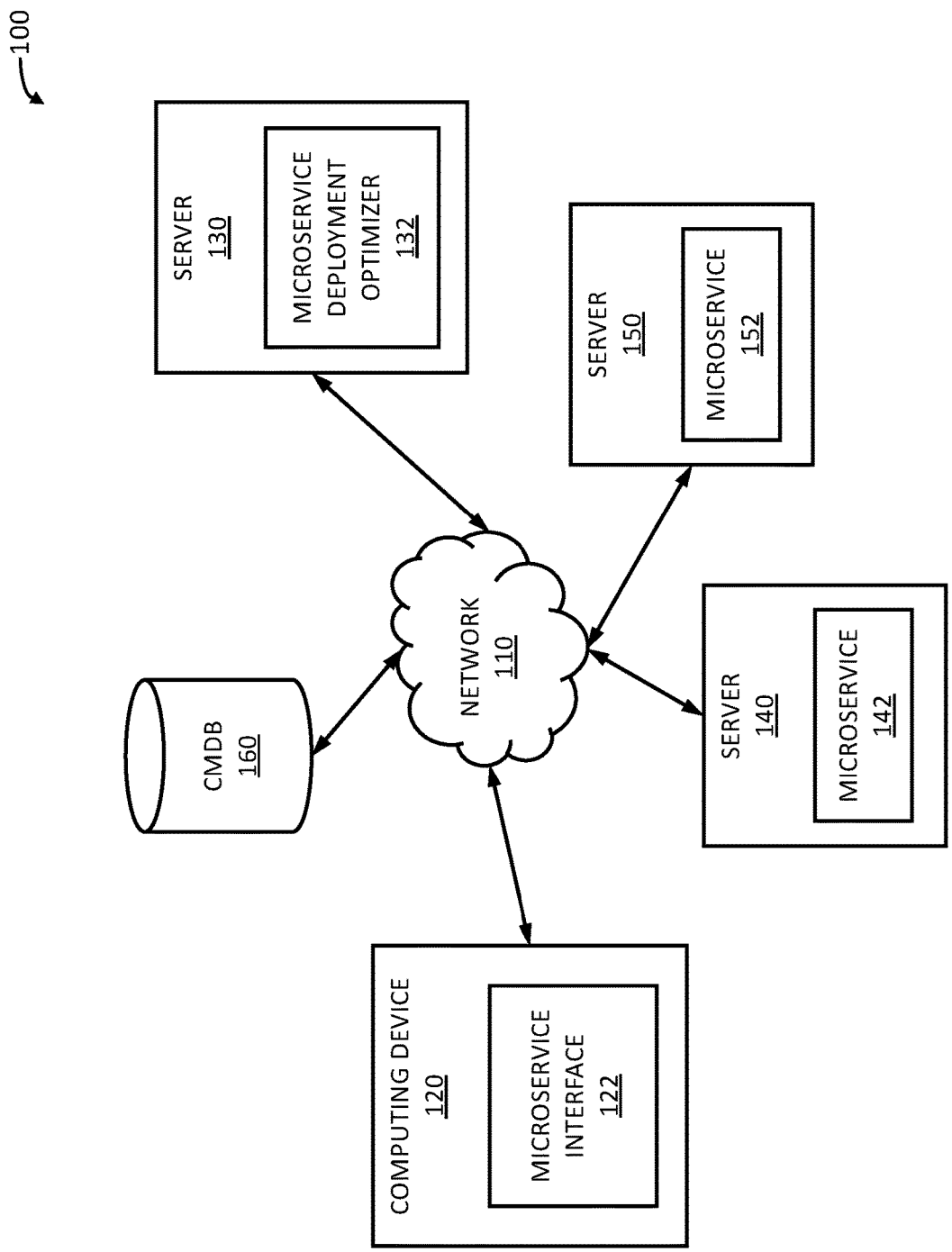
FIG. 1 is a block diagram illustrating a microservice deployment system, in accordance with an embodiment of the present invention.

As the popularity and acceptance of cloud computing increases, a growing number of software applications are moving to, and being developed for (e.g., cloud-native applications), a cloud deployment architecture. In fact, a majority of enterprises are already committing to hybrid multi-cloud deployments and a majority of existing non-cloud applications will move to the cloud within the near future. Cloud computing is a model for enabling convenient, on-demand network access to a shared pool of configurable computing resources (e.g., networks, servers, storage, applications, and services) that can be rapidly provisioned and released with minimal management effort or service provider interaction. A hybrid multi-cloud computing environment is a composition of two or more clouds (e.g. private, community, or public) that remain unique entities but are bound together by standardized or proprietary technology that enables data and application portability. Cloud computing provides several potential benefits to an enterprise, for example: reducing or eliminating the capital expense of buying the hardware and software necessary to set up and run an on-site datacenter, providing ability to choose from a set of services (e.g., SaaS, IaaS, PaaS, BPaaS) to meet business needs, providing ability to scale computing resources (e.g., computing power, storage bandwidth) up or down to meet user demand, providing reliability through business continuity planning, and providing the ability to develop new applications faster via microservices architectures.

As mentioned above, it is common for a microservices architecture to be adopted for cloud-native applications, serverless computing, and applications using lightweight container deployment. Microservices architecture are a cloud-native architectural approach in which a single application is composed of many loosely coupled and independently deployable smaller components, or services. Each service executes a core function of an application and runs independent of other services of the application. These services typically have their own software stack, inclusive of the database and data model; communicate with one another over a combination of REST APIs, event streaming, and message brokers; and are organized by business capability. A benefit to using microservices is that application development teams are able to rapidly build new components, and/or update existing components, of applications to meet changing business needs as microservices can be individually deployed and individually scaled. Within the context of cloud computing, the combination of small, independently scalable components coupled with on-demand, pay-per-use infrastructure may allow an enterprise to realize significant cost benefits.

As organizations increase their use of microservices to implement enterprise level applications, optimal placement (i.e. deployment locations) of these microservices within a cloud computing environment becomes increasingly vital to ensure acceptable microservice performance for users of the microservices. An organization may have multiple options when considering deployment locations for their microservices. For instance, an organization may choose to deploy their microservices at multiple locations including on-premise private clouds, off-premise private clouds, and various public clouds. As an organization considers various deployment locations within a cloud computing environment, it must also weigh several other essential aspects relating to application performance such as resource demands, user distribution, and network traffic demands. Microservices involved in running an enterprise level application may have diverse resource demands such as CPU processing requirements, memory requirements, and disk space utilization requirements. Also, the microservices involved in the application may have high traffic demands among them due to collaborative data communications between the microservices (e.g., an internet related application front-end microservice at one location communicating with a database back-end related microservice at another location). Additionally, the users of the microservices (i.e., the application implemented by the microservices) may also be distributed across different locations (i.e., user spread). For example, an internet related application front-end implemented by a microservice may be accessed form dispersed client locations around the world. In such an example, a load generated by client traffic may also be distributed across world locations. Poorly handled traffic demands may result in significant performance issues such as high application response time and jitter.

Consequently, when deploying a microservice-based enterprise level application in a cloud computing environment (e.g., a hybrid multi-cloud computing environment), several factors affecting the relative network performance of various platforms must be considered. Such factors may include, but are not limited to: the user spread (for the microservice) across various locations; computing resource availability at various potential deployment locations; network latency between various clouds (e.g., on-premise private clouds, off-premise private clouds, and various public clouds); microservice dependency maps; peak usage times for each microservice (based on historical learning); performance patterns; compliance and regulatory requirements; and data residency requirements. Optimal microservice (e.g., application module) placement is not only desired but is necessary for an enterprise as it improves overall application scalability and resilience. Accordingly, there is a need for a solution that addresses the above issues and weighs the relevant factors when determining microservice deployment locations.

In an effort to meet the need stated above, embodiments of the present invention may include a Microservice Deployment (MD) System 100, described below, which presents a system and associated methods to determine the optimal target location(s) for deployment of microservices (MS) in a hybrid multi-cloud computing environment using bipartite graph matching while considering one or more factors including, the relative network performance of various platforms, user spread map(s) for each microservice across various locations, resource availability at each target location, network latency between various clouds, microservice dependency maps for applications, peak usage time for each microservice (based on historical learning), performance patterns, compliance/regulation requirements, and data residency requirements. In embodiments of the invention, MD System 100 may also utilize bipartite graph matching in addition to analysis of one or more of the afore mentioned factors to automatically relocate microservice(s) for optimal application performance.

An enterprise implementing a cloud native application in a hybrid multi-cloud computing environment and/or serving users in different geographies may utilize embodiments of the present invention to optimally place dependent microservices of the application. Doing so would be advantageous for an enterprise as deploying an optimal number of microservices to optimal locations would enable the enterprise to reduce costs associated with a cloud environment implementation and provide increased application response.

Additionally, in embodiments of the invention, MD System 100 may allow for microservices to be placed at optimal locations based on threshold changes in at least one of: user spread maps; application performance; resource availability in one or more particular clouds; load on one or more particular microservices; and dynamic cloud performance of various clouds hosting the microservices. For example, the deployment location of a microservice(s) that provides user management and interface functions changes when more application users log-in from different locations (i.e., a change in a user spread map) even if the total number of application users remains the same. In this example, the location of the microservice host is changed despite there being no change in the workload of the host/microservice. In addition to the change in location of application users, the change in location of the host is based on the proximity of a target location to any dependent microservices (including any microservices providing data and data replication) as derived from a dependency map with disclosed relative criticality value of microservices. This results in a minimizing of distance of the microservice between data and application users. Concurrently, in embodiments of the invention, MD System 100 may also calculate resource demand of the microservice based on historical learning for a specific duration and the availability of resources at the available target locations, and/or predicted resource availability at the available target locations, for a specific duration based on the historical data.

Furthermore, in embodiments of the invention, MD System 100 dynamically monitors all the aforementioned variables and adjusts the optimized location of the microservice accordingly. For instance, if a particular cloud does not provide the required performance (e.g., network latency increases, utilization increases the threshold, etc.), it triggers the optimization algorithm used by MD System 100 which utilizes bipartite graph matching based on one or more factors including, the relative network performance of various platforms, user spread map(s) for each microservice across various locations, resource availability at each target location, network latency between various clouds, microservice dependency maps for applications, peak usage time for each microservice (based on historical learning), performance patterns, compliance/regulation requirements, and data resiliency requirements.

Embodiments of the present invention assume the following technical components/assets/capabilities exist as necessary background and are implemented via known technologies: a hybrid cloud environment; system/application performance management tools; workload automation/orchestration/migration tools; historical performance data about workloads/data center locations; and a configuration management data base.

Embodiments of the present invention will now be described in detail with reference to the accompanying Figures.

FIG. 1 is a functional block diagram illustrating Microservice Deployment System 100, in accordance with an embodiment of the present invention. Microservice Deployment System 100 is a network of computers, data processing systems, and other devices in which the illustrative embodiments may be implemented. In an example embodiment, Microservice Deployment System 100 may include computing device 120, CMDB 160, and servers 130, 140, and 150, all interconnected via network 110.

In various embodiments, network 110 is a communication channel capable of transferring data between connected devices. In an example embodiment, network 110 may be the Internet, representing a worldwide collection of networks and gateways to support communications between devices connected to the Internet. Moreover, network 110 may include, for example, wired, wireless, or fiber optic connections which may be implemented as an intranet network, a local area network (LAN), a wide area network (WAN), or any combination thereof. In further embodiments, network 110 may be a Bluetooth network, a WiFi network, or a combination thereof. In general, network 110 can be any combination of connections and protocols that will support a cloud computing environment (e.g., a hybrid multi-cloud computing environment) adapted to run microservices and will support communications between computing device 120, CMDB 160, and servers 130, 140, and 150.

In an example embodiment, computing device 120 may include microservice interface 122. Computing device 120 may be a laptop computer, a notebook, a tablet computer, a netbook computer, a personal computer (PC), a desktop computer, a personal digital assistant (PDA), a smart phone, a wearable computing device, a smart tv, or any other electronic device or computing system capable of sending, and receiving data to and from other computing devices such as CMDB 160 and servers 130, 140, and 150, via network 110, and capable of supporting the functionality required of embodiments of the invention (e.g., running an application implemented via one or more deployed microservices of MD System 100). For example, computing device 120 may support a communication link (e.g., wired, wireless, direct, via a LAN, via the network 110, etc.) between computing device 120, CMDB 160, and one or more of servers 130, 140, and 150. Data sent from computing device 120 may include data from microservice interface 122. Data received by computing device 120 may include data sent, via network 110, from one or more of CMDB 160 and servers 130, 140, and 150, described below. While computing device 120 is shown as a single device, computing device 120 may represent a plurality of workstations corresponding to a plurality of different users. The users may be, for example, users of an application implemented via microservice architectures. Computing device 120 may be described, generally, with respect to FIG. 3 below. In an example embodiment, computing device 120 may send, via network 110, data captured by microservice interface 122 to one or more of microservice 142 and microservice 152 located on server 140 and server 150, respectfully. In an example embodiment, computing device 120 may receive data from one or more of microservice 142 and microservice 152 located on server 140 and server 150, respectfully.

In an example embodiment, microservice interface 122 may be a program, or subroutine contained in a program, that may allow a user of computing device 120 to interact with one or more microservices of MD System 100 (e.g., microservice 142, microservice 152), via network 110. In an example embodiment, microservice interface 122 may be a user interface for a software application implemented via micro services of MD System 100 (e.g., a web browser application for accessing microservices of MD System 100). For example, a user of an application implemented through the microservice architecture of MD System 100 may call upon functions provided by microservice 142 and/or microservice 152, via microservice interface 122. In addition, microservice interface 122 may be connectively coupled to hardware components, such as those depicted by FIG. 3, for receiving user input, including mice, keyboards, touchscreens, microphones, cameras, and the like. In an example embodiment, microservice interface 122 is implemented via a web browsing application containing a graphical user interface (GUI) and display that is capable of transferring data files, folders, audio, video, hyperlinks, compressed data, and other forms of data transfer individually or in bulk. In other embodiments, microservice interface 122 may be implemented via other integrated or standalone software applications and hardware capable of receiving user interaction and communicating with other electronic devices. In an example embodiment, microservice interface 122 may send and receive data to and from CMDB 160, microservice 142, and/or microservice 152, via network 110. Additionally, in an example embodiment, microservice interface 122 may utilize services provided by microservice 142, and/or microservice 152, via network 110.

In an example embodiment, CMDB 160 may be a laptop computer, tablet computer, netbook computer, personal computer (PC), desktop computer, a networked computer appliance, or any other networked programmable electronic device capable of storing data and capable of an exchange of data with other electronic devices (e.g., computing device 120 and servers 130, 140, and 150), for example, through a network adapter, in accordance with an embodiment of the invention. Additionally, CMDB 160 may represent a plurality of the aforementioned network storage devices. In embodiments of the present invention, CMDB 160 may store historical and current configuration data for the microservices, which comprise an application, deployed in MD System 100 (e.g., microservice 142, microservice 152). In embodiments of the present invention, CMDB 160 may store historical and current configuration data for the application as a whole. In embodiments of the present invention, CMDB 160 may also store historical and current information on configurations provided by one or more cloud providers. Further, in embodiments of the present invention, CMDB 160 may store identifiers and uniform resource locators for a plurality of client computing devices (e.g., computing device 120), identifiers and uniform resource locators for a plurality of servers (e.g., servers 130, 140, and 150) in a remote computing environment, a plurality of different microservice architectures, microservice source code, software development kits, and the like. Furthermore, in embodiments of the present invention, CMDB 160 may store other types of data, both historical and current, such as the relative network performance of various platforms, user spread map(s) for each microservice across various locations, resource availability at each target location, network latency between various clouds, microservice dependency maps for applications, peak usage time for each microservice (based on historical learning), performance patterns, compliance/regulation requirements, and data resiliency requirements, for example. In embodiments of the present invention, the data stored within CMDB 160 may be populated during an initialization process of MD System 100. The data stored within CMDB 160 may also be populated before, after, and/or during deployment of microservices within MD System 100. In embodiments of the present invention, the data stored in CMDB 160 may be structured (i.e. have associated metadata), partially structured, or unstructured. In an example embodiment, in CMDB 160 may contain configuration data of one or more microservices deployed throughout MD System 100 (e.g., microservices 142 and 152) and other types of data pertaining to MD System 100. The data within CMDB 160 may be retrieved by microservice deployment optimizer 132, discussed below, via server 130 and network 110. The data within CMDB 160 may also be retrieved, via network 110, by microservice interface 122, located on computing device 120, and microservices 142 and 152, located on servers 140 and 150, respectively. CMDB 160 may be described generally with respect to FIG. 3 below. In another embodiment, CMDB 160 may be located within servers 130, 140, and/or 150.

In an example embodiment, server 140 may include microservice 142. Server 140 may be a desktop computer, a notebook, a laptop computer, a blade server, a networked computer appliance, a virtual device, or any other networked electronic device or computing system capable of receiving and sending data from and to other computing devices such as computing device 120, CMDB 160, server 130, and server 150, via network 110, and capable of supporting the functionality required of embodiments of the invention. In embodiments of the invention, server 140 may host one or more services (e.g., microservice 142) corresponding to a microservices architecture comprising a plurality of different microservices. In an example embodiment, server 140 may function to process data received from computing device 120, CMDB 160, server 150, and server 130, via network 110. While server 140 is shown as a single device, in other embodiments, server 140 may represent a cluster or plurality of servers, working together or working separately, to host one or more microservice architectures that perform one or more services. Server 140 may be described generally with respect to FIG. 3 below.

In an example embodiment, microservice 142 may be a program, or subroutine contained in a program, that may implement a set of distinct features or functionality (e.g., receiving a user request or retrieving data from or storing data into a database) of an application deployed in MD System 100. In an example embodiment, microservice 142 may expose an application programming interface (API) (e.g., a REST API) that is consumed by another microservice (e.g., microservice 152) or by the application's users via microservice interface 122 located on computing device 120. In microservice architectures, various microservices may communicate with each other using REST APIs as they provide interoperability between desperate computer systems and resources. REST APIs are provided as a non-limiting example herein based on enabling cross-platform and cross-system communications. In another embodiment, microservice 142 may implement a web user interface. In some embodiments of the present invention, the microservices utilize different communication technologies to communicate across microservices, including hypertext transfer protocol (HTTP) and/or hypertext transfer protocol secure (HTTPS). In an example embodiment, microservice 142 may provide a set of distinct features or functionality to a user of computing device 120. Microservice 142 may represent a cluster or plurality of microservices, working together or working separately, to implement a set of distinct features or functionality of an application deployed in MD System 100 and accessed by computing device 120, via microservice interface 122 and network 110.

In an example embodiment, server 150 may include microservice 152. Server 150 may be a desktop computer, a notebook, a laptop computer, a blade server, a networked computer appliance, a virtual device, or any other networked electronic device or computing system capable of receiving and sending data from and to other computing devices such as computing device 120, CMDB 160, server 130, and server 140, via network 110, and capable of supporting the functionality required of embodiments of the invention. In embodiments of the invention, server 150 may host one or more services (e.g., microservice 152) corresponding to a microservices architecture comprising a plurality of different microservices. In an example embodiment, server 150 may function to process data received from computing device 120, CMDB 160, server 140, and server 130, via network 110. While server 150 is shown as a single device, in other embodiments, server 150 may represent a cluster or plurality of servers, working together or working separately, to host one or more microservice architectures that perform one or more services. Server 150 may be described generally with respect to FIG. 3 below.

In an example embodiment, microservice 152 may be a program, or subroutine contained in a program, that may implement a set of distinct features or functionality (e.g., receiving a user request or retrieving data from or storing data into a database) of an application deployed in MD System 100. In an example embodiment, microservice 152 may expose an application programming interface (API) (e.g., a REST API) that is consumed by another microservice (e.g., microservice 142) or by the application's users via microservice interface 122 located on computing device 120. In microservice architectures, various microservices may communicate with each other using REST APIs as they provide interoperability between desperate computer systems and resources. REST APIs are provided as a non-limiting example herein based on enabling cross-platform and cross-system communications. In another embodiment, microservice 152 may implement a web user interface. In some embodiments of the present invention, the microservices utilize different communication technologies to communicate across microservices, including hypertext transfer protocol (HTTP) and/or hypertext transfer protocol secure (HTTPS). In an example embodiment, microservice 152 may provide a set of distinct features or functionality to a user of computing device 120. Microservice 152 may represent a cluster or plurality of microservices, working together or working separately, to implement a set of distinct features or functionality of an application deployed in MD System 100 and accessed by computing device 120, via microservice interface 122 and network 110.

In an example embodiment, server 130 may include microservice deployment optimizer 132. Server 130 may be a desktop computer, a notebook, a laptop computer, a blade server, a networked computer appliance, a virtual device, or any other networked electronic device or computing system capable of receiving and sending data from and to other computing devices such as computing device 120, CMDB 160, server 140, and server 150, via network 110, and capable of supporting the functionality required of embodiments of the invention. In embodiments of the invention, server 130 may provide one or more services corresponding to a microservices architecture comprising a plurality of different microservices. In an example embodiment, server 130 may function to process data received from computing device 120, CMDB 160, server 140, and server 150, via network 110. While server 130 is shown as a single device, in other embodiments, server 130 may represent a cluster or plurality of servers, working together or working separately, to host one or more microservice architectures that perform one or more services. Server 130 may be described generally with respect to FIG. 3 below.

In embodiments of the present invention, servers 130, 140, and 150 may communicate with one another and may be grouped physically or virtually into one or more networks, such as private, community, public, or hybrid clouds as described hereinabove, or a combination thereof. This allows MD System 100 to offer infrastructure, platforms, and/or software as services for which a cloud consumer does not need to maintain resources on a computing device, such as computing device 120. It is understood that the type of computing device 120 is intended to be illustrative only and that servers 130, 140, and 150 and MD System 100 can communicate with any type of computerized device over any type of network and/or network addressable connection using a web browser, for example.

In an example embodiment, microservice deployment optimizer 132 may be a program, or subroutine contained in a program, that may monitor, manage, and scale different constituent microservices (e.g., microservices 142 and 152) of an application deployed in MD System 100. In an example embodiment, microservice deployment optimizer 132 may send and receive data to and from microservice interface 122, CMDB 160, microservice 142, and/or microservice 152, via network 110. As part of monitoring, managing, and scaling deployed constituent microservices of an application provided by MD System 100, microservice deployment optimizer 132 may create a dependency map, within the context of the application, of the deployed microservices. The dependency map may be in the form of a time series based graph with the microservices as vertices and the relationships between the microservices as edges. Each edge may have a value which represents the network latency between the locations in which the respective constituent microservices are deployed. Microservice deployment optimizer 132 may create one or more records comprising microservice name, relative criticality value, and location of the microservice.

Furthermore, in an example embodiment, as part of monitoring, managing, and scaling deployed constituent microservices of an application provided by MD System 100, microservice deployment optimizer 132 may also identify attributes, with associated current values, of the deployed microservices and their respective locations. The attributes may include, but are not limited to: 1) a prediction of location based user spread map for various time periods; 2) a prediction of the processing load on each microservice resulting from user requests and/or other microservices of MD System 100 for various periods of time; 3) a prediction of resource availability at one or more prospective target deployment locations for various periods of time; 4) a prediction of network latency among all deployment locations for various periods of time; and 5) a list of compliant prospective target deployment locations for each microservice. Moreover, values for the aforementioned attributes may be determined at specified time intervals or in response to specified triggering events. Additionally, microservice deployment optimizer 132 may, with the help of natural language processing and other known technologies, map each microservice with available prospective target deployment locations as per enterprise compliance requirements derived from various enterprise documentation, principles and standards.

In an example embodiment, microservice deployment optimizer 132 may access historical data from various enterprise repositories (e.g., CMDB 160) in order to predict the resource demand of each microservice, resource availability at various prospective target deployment locations, individual processing performance of the constituent microservices at various time periods, as well as the collective application performance at various time periods. A user spread map for each microservice may also be predicted based on the historical data. Additionally, in an example embodiment, microservice deployment optimizer 132 may create a bipartite graph using microservices and deployment locations as nodes with attributes related to the context of the application. In the mathematical field of graph theory, a bipartite graph is a graph whose vertices can be divided into two disjoint and independent sets such that every edge connects a vertex in one set to a vertex in the other set. Within the context of the present invention, the left side of the bipartite graph (i.e., one of the two sets of vertices) created by microservice deployment optimizer 132 may be the microservices depicted in the abovementioned dependency map among constituent microservices of an application provided by MD System 100. The right side of the created bipartite graph (i.e., the other set of the two sets of vertices) may be prospective target deployment locations. Edges connecting nodes of one set of vertices (i.e., the microservices) to nodes of the other set of vertices (i.e., the prospective target deployment locations) may have a weight/value which represents network latency. Each node within the two sets of vertices (i.e., the microservices and the prospective target deployment locations) may have attributes, of the abovementioned identified attributes, which microservice deployment optimizer 132 may utilize in determining optimal target deployment locations within the context of the application.

In embodiments of the invention, MD System 100 may, via microservice deployment optimizer 132, respond to triggering events such as, but not limited to, changes in user distribution across locations, changes in application performance, changes in network latency between dependent microservice locations, changes in location of microservices, and changes in processing loads on microservices. In response to such events, microservice deployment optimizer 132 may, in an example embodiment, relocate one or more micro services and/or identify one or more optimal prospective target deployment locations for each microservice. Relocation of microservices and/or identification of optimal target deployment locations, may be based, in part, on factors such as the impact of relocation of a microservice on any dependent microservices (e.g., increased network latency between dependent microservices, migration costs), user spread map for a particular microservice of MD System 100 (including locations of requests from other microservices of MD System 100), predicted future processing workload demands on microservices, availability of resources at a prospective target deployment location, and historical data/predictions relating to network latency and processing workload demands. Additionally, in relocating microservices and/or identifying optimal target deployment locations, microservice deployment optimizer 132 may utilize the abovementioned bipartite graph to match microservice nodes to deployment location nodes in such a manner as to minimize network latency while considering all node attributes. The resulting matches seek to minimize network latencies with respect to other microservices as well as with respect to user distribution. For instance, a target deployment location may be identified, in part, due to it having a close location (in terms of network latency) to a larger user population while still satisfying legal/compliance requirements and peak usage requirements. The operations and functions of microservice deployment optimizer 132 are described in further detail below with regard to FIG. 2.

Figure 2:
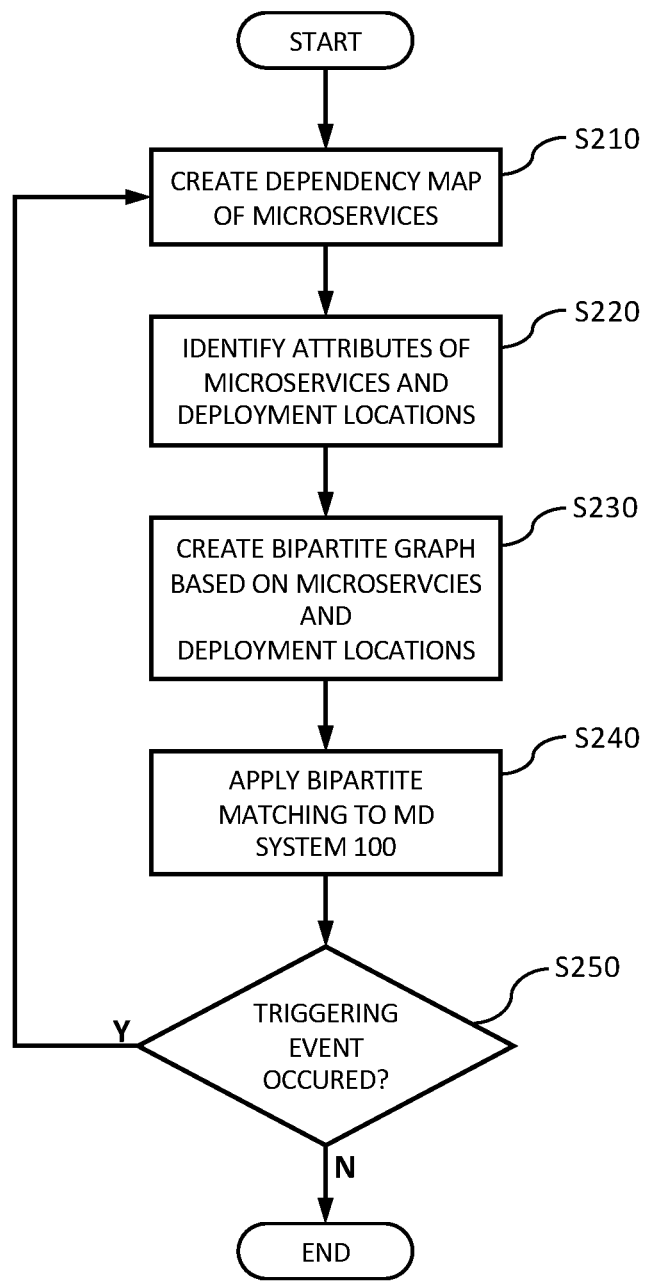
FIG. 2 is a flowchart illustrating the operations of the microservice deployment optimizer of FIG. 1, in accordance with an embodiment of the invention.

FIG. 2 shows a flowchart illustrating the operations of microservice deployment optimizer 132 in accordance with an example embodiment of the invention. As discussed above, an enterprise application generally consists of hundreds of constituent microservices. Referring to step S210, microservice deployment optimizer 132 may create one or more dependency maps of the constituent microservices of an application deployed in MD System 100 as well as determine a relative criticality value for each constituent microservice. Microservice deployment optimizer 132 may create the one or more dependency maps using known technologies (e.g., a microservice service mesh tool such as Istio) or by collecting distributed traces for every user request of a microservice. Microservice deployment optimizer 132 may also use historical data (e.g., historical data stored in CMDB 160) relating to interactions between the constituent microservices in determining accurate microservice dependencies for the one or more dependency maps. In an example embodiment, microservice deployment optimizer 132 creates one or more dependency maps for constituent microservices 142 and 152 of an enterprise application provided by MD System 100.

With continued reference to step S210, in an example embodiment, microservice deployment optimizer 132 may transform a created dependency map into a time series based graph representation by designating the constituent microservices as vertices and the dependencies between them as edges between the vertices. Additionally, microservice deployment optimizer 132 may calculate a relative criticality value for each constituent microservice as a function of criticality of application, as defined by configuration data stored within CMDB 160, and relative criticality of the microservice within the context of the application. Relative criticality of a microservice within the context of the application may be assigned manually by a developer team. Relative criticality of a microservice within the context of the application may also be calculated by micro service deployment optimizer 132 based on analysis of application historical data such as, but not limited to, volume of user (and other microservice) requests to the microservice, data transmitted through or referenced by each microservice, microservice access frequency by users, documentation about the application and its modules, comments within microservice definitions, and catalogue definitions. In an example embodiment, such historical data may be stored within CMDB 160 and accessed/maintained by microservice deployment optimizer 132. Furthermore, microservice deployment optimizer 132 may update the time series based graph at frequent intervals with network latency as the cost/value associated with each edge between the constituent microservices based on a current deployment location of each microservice with the hybrid multi-cloud computing environment of MD System 100. Network latency between microservices may be determined using known tools and technologies. Also, the infrastructure and/or services provided at various microservice deployment locations within MD System 100 may be used as benchmarks to measure the network performance between two deployment locations.

Continuing with step S210, in an example embodiment, microservice deployment optimizer 132 creates a time series based graph with microservices 142 and 152 as vertices with edges between them having an associated network latency value. Furthermore, in an example embodiment, microservice deployment optimizer 132 calculates a relative criticality value for microservices 142 and 152. Micro service deployment optimizer 132 may also create a record for each microservice which comprises a microservice name and a corresponding relative criticality value. These records may be stored within CMDB 160. It should be noted that although only two microservices are depicted in FIG. 1, microservices 142 and 152 may be representative of a plurality (e.g., hundreds, thousands, etc.) of microservices and that consequently a time series based graph created by microservice deployment optimizer 132 at step S210 may comprise a plurality of vertices and edges.

Referring to step S220, in an example embodiment, microservice deployment optimizer 132 may identify attributes, with associated values, of the microservices represented in the dependency map and graph created in step S210, as well as attributes of deployment locations within MD System 100. Additionally, microservice deployment optimizer 132 may identify eligible deployment locations, within MD System 100, for each constituent microservice in accordance with compliance and data residency requirements of the microservice, the application as a whole, and any service level agreement (SLA) requirements. These requirements may be derived from documentation such as microservice and application documentation, enterprise standards, and principles and requirements documents with the help of known natural language processing tools and other known technologies. Such documentation may be stored in and retrieved from CMDB 160 by microservice deployment optimizer 132. The attributes identified by microservice deployment optimizer 132 may include identified/predicted network latencies between identified eligible deployment locations within MD System 100 using known tools/technologies. Microservice deployment optimizer 132 may base, in part, network latency and network performance predictions on historical data stored within CMDB 160. Moreover, microservice deployment optimizer 132 may update network latency and network performance predictions at specified time intervals.

With continued reference to step S220, in an example embodiment, the attributes identified by microservice deployment optimizer 132 may include identified/predicted computing resource demand for each of the microservices represented in the dependency map and graph created in step S210, as well as identified/predicted computing resource availability of the identified eligible deployment locations within MD System 100. These identifications and/or predictions may be based, in part, on the available historical data of MD System 100 which may be gathered, at least in part, through known network management technologies such as, but not limited to, performance management tools, capacity management tools, and hybrid cloud brokerage tools. In an example embodiment, microservice deployment optimizer 132 is able to predict the following at specified time intervals: computing resource demand (generated by requests from users and other microservices) of each constituent microservice of an application provided by MD System 100; computing resource availability at on-premise data centers, private cloud(s), and public cloud(s); individual performance of each constituent microservice; and collective application performance. Furthermore, in an example embodiment, the attributes identified by microservice deployment optimizer 132 may include identified/predicted changes in user spread maps (i.e., various locations of users, as well as locations of other constituent microservices, accessing a particular constituent microservices) for MD System 100 based, in part, on available historical data. Moreover, at step S220, microservice deployment optimizer 132 may identify current values of the above attributes at specified time intervals or in response to specified triggering events. In an example embodiment, microservice deployment optimizer 132 identifies attributes, with associated values, of microservices 142 and 152, as well as attributes of eligible deployment locations (e.g., server 140, server 150) within MD System 100.

Referring to step S230, in an example embodiment, microservice deployment optimizer 132 creates a bipartite graph using the microservices represented in the dependency map created in step S210 as one set of nodes and the eligible deployment locations identified in step S220 as the other set of nodes. It should be noted that the created bipartite graph is a modified version of a bipartite graph in that the nodes within each set of nodes are permitted to have edges among themselves. In an example embodiment, the left side of nodes (i.e., the left set of nodes) of the created bipartite graph are the microservices from the dependency map of step S210, while the right side of nodes (i.e., the right set of nodes) of the created bipartite graph are the eligible deployment locations identified in step S220. More specifically, the left side of the bipartite graph may be the time series based graph from step S210 with the constituent microservices as vertices with edges between them having an associated network latency value, while the right side of the bipartite are the eligible deployment locations identified in step S220. Edges between nodes of the left side of the bipartite graph and nodes of the right side of the bipartite graph may have an associated network latency value.

With continued reference to step S230, in addition to the attributes identified in step S220, the eligible deployment locations may also have attributes such as computing resource availability, computing resource predictions for various time intervals, compliance/regulatory specifications, and available technology options. Microservice deployment optimizer 132 may update all attributes of the eligible deployment locations at defined time intervals. In an example embodiment, microservice deployment optimizer 132 may create edges among the nodes of the right side (i.e., the eligible deployment locations) of the created bipartite graph based on existence of connectivity between the locations. The edges between the locations may have an associated cost/value which represents the network latency from each location to another location. Microservice deployment optimizer 132 may determine the costs/values based, at least in part, on historical data stored within CMDB 160. Furthermore, microservice deployment optimizer 132 may update the cost/values at specified time intervals. In addition to the attributes identified in step S220, the microservices of the left side of the created bipartite graph may also have attributes comprising information on peak usage time periods, current computing resource demands, prediction of computing resource demands for various time periods, compliance specifications (specific to target location and other aspects), data residency requirements, technology specifications, users accessing the microservice from various locations, SLA requirements, and relative criticality value.

Continuing with step S230, in an example embodiment, microservice deployment optimizer 132 creates edges between nodes of the left side (i.e., the microservices from the dependency map of step S210) of the created bipartite graph and nodes of the right side (i.e., the eligible deployment locations) of the created bipartite graph based on the available attributes of eligible deployment locations described above. For example, microservice deployment optimizer 132 may create an edge between a constituent microservice (e.g., microservice 142, microservice 152) of the right side of the bipartite graph and an eligible deployment location of the left side of the bipartite graph when evaluation of the attributes of the eligible deployment location results in a determination that the eligible deployment location is able to satisfy the computing resource demands during peak usage time periods for the constituent microservice.

Referring to step S240, in an example embodiment, microservice deployment optimizer 132 utilizes the bipartite graph created in step S230 to apply bipartite matching to MD System 100. The goal of the bipartite matching process is to identify allocation(s) of constituent microservice(s) to eligible deployment location(s) while minimizing the network latencies between them. When identifying an allocation, microservice deployment optimizer 132 may, in an example embodiment, base a determination of latency value for the allocation on factors such as, but not limited to, latency arising from constituent microservice to constituent microservice communication (taking into account the relative criticality value of each constituent microservice) and latency arising from microservice access from users spread throughout different locations. In an example embodiment, microservice deployment optimizer 132 may determine network latency value for an identified allocation using the formulas:

$$\text{latency\_overall}(M\_i) = \text{latency\_microservice\_communication}(M\_i, L\_i) + \text{latency\_user\_spread}(L\_i, L\_i, \text{user spread\_map}) \quad (1)$$

$$\text{latency\_microservice\_communication} = \text{latency\_withinlocation}(M\_i, L\_i) + \text{latency across\_location}(M\_i, L\_i) \quad (2)$$

$$\text{latency\_for\_matching} = \text{sum over all latencies for each microservice} \quad (3)$$

where M_i is a constituent microservice of MD System 100 allocated to location L_i within MD System 100. In embodiments of the invention, bipartite graph matching may be solved using existing bipartite matching algorithms where the goal is to minimize the latency. In an example embodiment, microservice deployment optimizer 132 may, in response to the applied bipartite matching process, relocate one or more constituent microservices within MD System 100.

Referring to step S250, in an example embodiment, microservice deployment optimizer 132 determines whether or not to re-apply bipartite graph matching (and perform necessary associated steps) on MD System 100 based on the occurrence of a triggering event. Microservice deployment optimizer 132 may wait for the occurrence of one or more triggering events before rearranging the deployment locations of constituent microservices within MD System 100. In an example embodiment, a triggering event may include a change (based on determined thresholds) in the user and/or microservice spread map (e.g., user access of a microservice from location A changes from 90% to 10% during a time period where the business day has ended in a country, while correspondingly user access from location B increases during the same time period in other parts of the world where the business day has begun). Such workload rearrangement can save an enterprise data transfer related costs within clouds. In an example embodiment, a triggering event may also include a change (based on determined thresholds) in application performance, especially from the network latency perspective, based on the time series based graph. Furthermore, a triggering event may occur when processing load on a particular constituent microservice changes (based on determined thresholds) in relation to demand (e.g. traffic is more than the threshold at month end & beginning) and the current deployment location cannot meet the demand within the agreed threshold time. Additionally, a triggering event may include a change in the deployment location of a microservice based on various parameters including lack of resource availability in a cloud or giving way to other high priority microservices.

Whenever a triggering event occurs, whether manually (for planned outages) or automated, for rearrangement of microservice deployment locations, micro service deployment optimizer 132 re-performs the bipartite matching (and any necessary steps) to match constituent microservice nodes to the eligible deployment location nodes in such a manner as to minimize network latency while considering all the attributes of the nodes. In doing so, microservice deployment optimizer 132 seeks to minimize network latencies among constituent microservices of MD System 100 as well as network latencies with respect to user distribution through identification of target eligible deployment locations close (in terms of network latency) to the larger user population, while continuing to satisfy legal and peak usage requirements and other attributes of constituent microservices and deployment locations.

Figure 3:
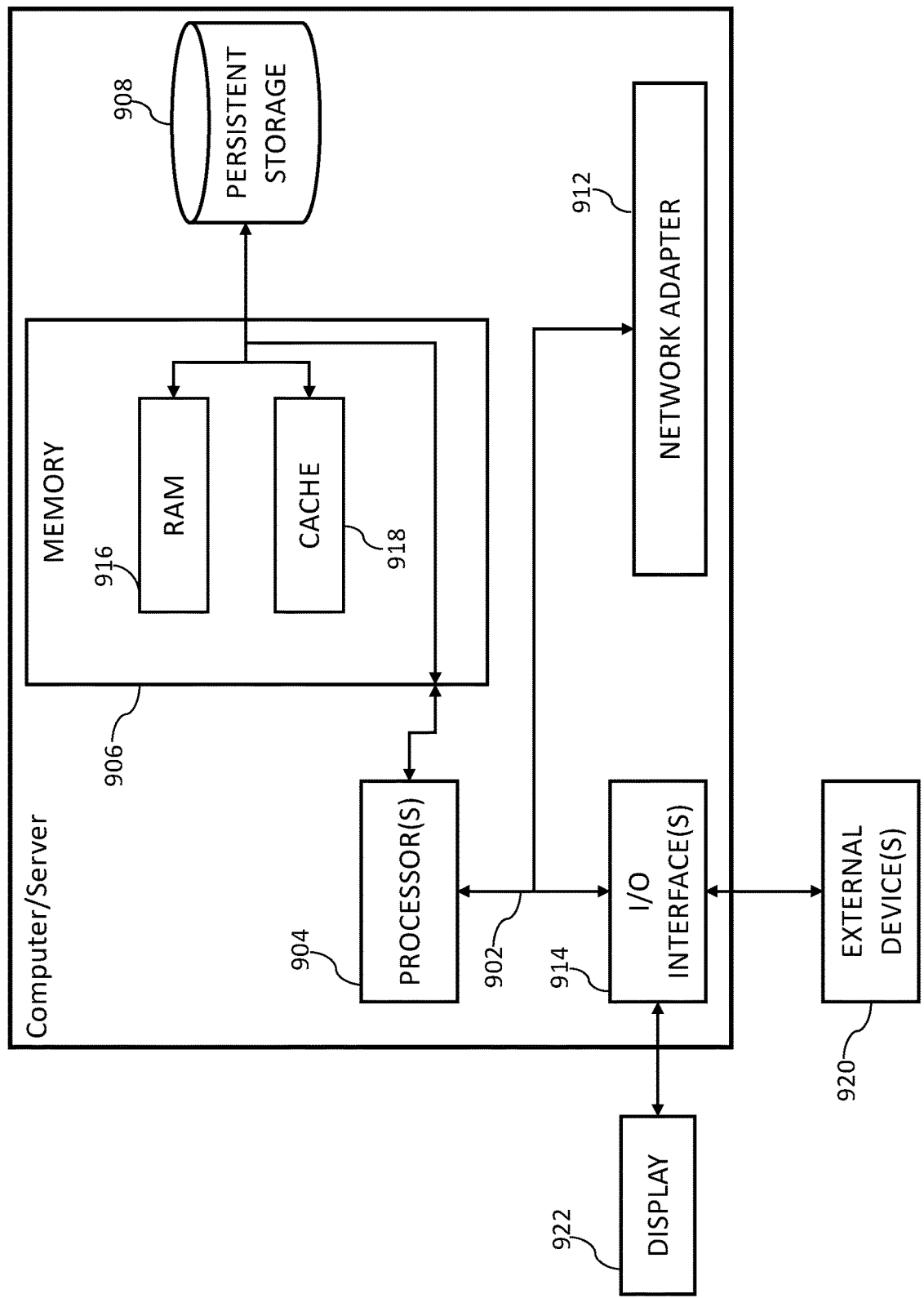
FIG. 3 is a block diagram depicting the hardware components of the micro service deployment system of FIG. 1, in accordance with an embodiment of the invention.

FIG. 3 depicts a block diagram of components of computing device 120, server 130, server 140, server 150, and CMDB 160, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made.

Computing device 120, server 130, server 140, server 150, and CMDB 160 include communications fabric 902, which provides communications between computer processor(s) 904, memory 906, persistent storage 908, network adapter 912, and input/output (I/O) interface(s) 914. Communications fabric 902 can be implemented with any architecture designed for passing data and/or control information between processors (such as microprocessors, communications and network processors, etc.), system memory, peripheral devices, and any other hardware components within a system. For example, communications fabric 902 can be implemented with one or more buses.

Memory 906 and persistent storage 908 are computer-readable storage media. In this embodiment, memory 906 includes random access memory (RAM) 916 and cache memory 918. In general, memory 906 can include any suitable volatile or non-volatile computer-readable storage media.

The programs microservice interface 122 in computing device 120; microservice 142 in server 140; microservice 152 in server 150; and microservice deployment optimizer 132 in server 130 are stored in persistent storage 908 for execution by one or more of the respective computer processor(s) 904 via one or more memories of memory 906. In this embodiment, persistent storage 908 includes a magnetic hard disk drive. Alternatively, or in addition to a magnetic hard disk drive, persistent storage 908 can include a solid state hard drive, a semiconductor storage device, read-only memory (ROM), erasable programmable read-only memory (EPROM), flash memory, or any other computer-readable storage media that is capable of storing program instructions or digital information.

The media used by persistent storage 908 may also be removable. For example, a removable hard drive may be used for persistent storage 908. Other examples include optical and magnetic disks, thumb drives, and smart cards that are inserted into a drive for transfer onto another computer-readable storage medium that is also part of persistent storage 908.

Network adapter 912, in these examples, provides for communications with other data processing systems or devices. In these examples, network adapter 912 includes one or more network interface cards. Network adapter 912 may provide communications through the use of either or both physical and wireless communications links. The programs microservice interface 122 in computing device 120; microservice 142 in server 140; microservice 152 in server 150; and microservice deployment optimizer 132 in server 130 may be downloaded to persistent storage 908 through network adapter 912.

I/O interface(s) 914 allows for input and output of data with other devices that may be connected to computing device 120, server 130, server 140, server 150, and CMDB 160. For example, I/O interface 914 may provide a connection to external devices 920 such as a keyboard, keypad, a touch screen, and/or some other suitable input device. External devices 920 can also include portable computer-readable storage media such as, for example, thumb drives, portable optical or magnetic disks, and memory cards. Software and data used to practice embodiments of the present invention, e.g., programs microservice interface 122 in computing device 120; microservice 142 in server 140; microservice 152 in server 150; and microservice deployment optimizer 132 in server 130, can be stored on such portable computer-readable storage media and can be loaded onto persistent storage 908 via I/O interface(s) 914. I/O interface(s) 914 can also connect to a display 922.

Display 922 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

While steps of the disclosed method and components of the disclosed systems and environments have been sequentially or serially identified using numbers and letters, such numbering or lettering is not an indication that such steps must be performed in the order recited and is merely provided to facilitate clear referencing of the method's steps. Furthermore, steps of the method may be performed in parallel to perform their described functionality.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
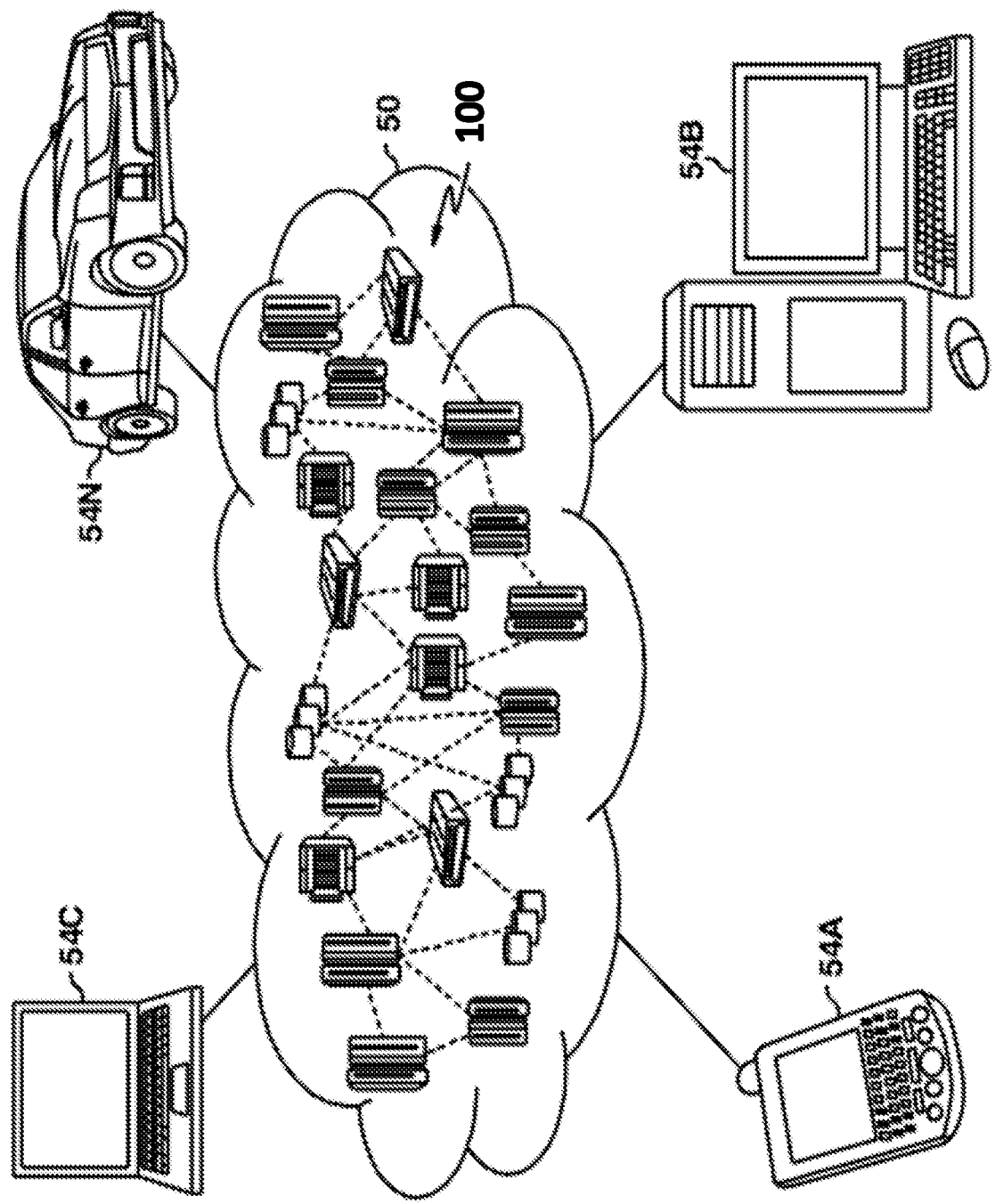
FIG. 4 depicts a cloud computing environment in accordance with an embodiment of the present invention.

Referring now to FIG. 4, illustrative cloud computing environment 50 is depicted. As shown, cloud computing environment 50 includes one or more cloud computing nodes 100 with which local computing devices used by cloud consumers, such as, for example, personal digital assistant (PDA) or cellular telephone 54A, desktop computer 54B, laptop computer 54C, and/or automobile computer system 54N may communicate. Nodes 100 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 100 and cloud computing environment 50 can communicate with any type of computerized device over any type of network and/or network addressable connection (e.g., using a web browser).

Figure 5:
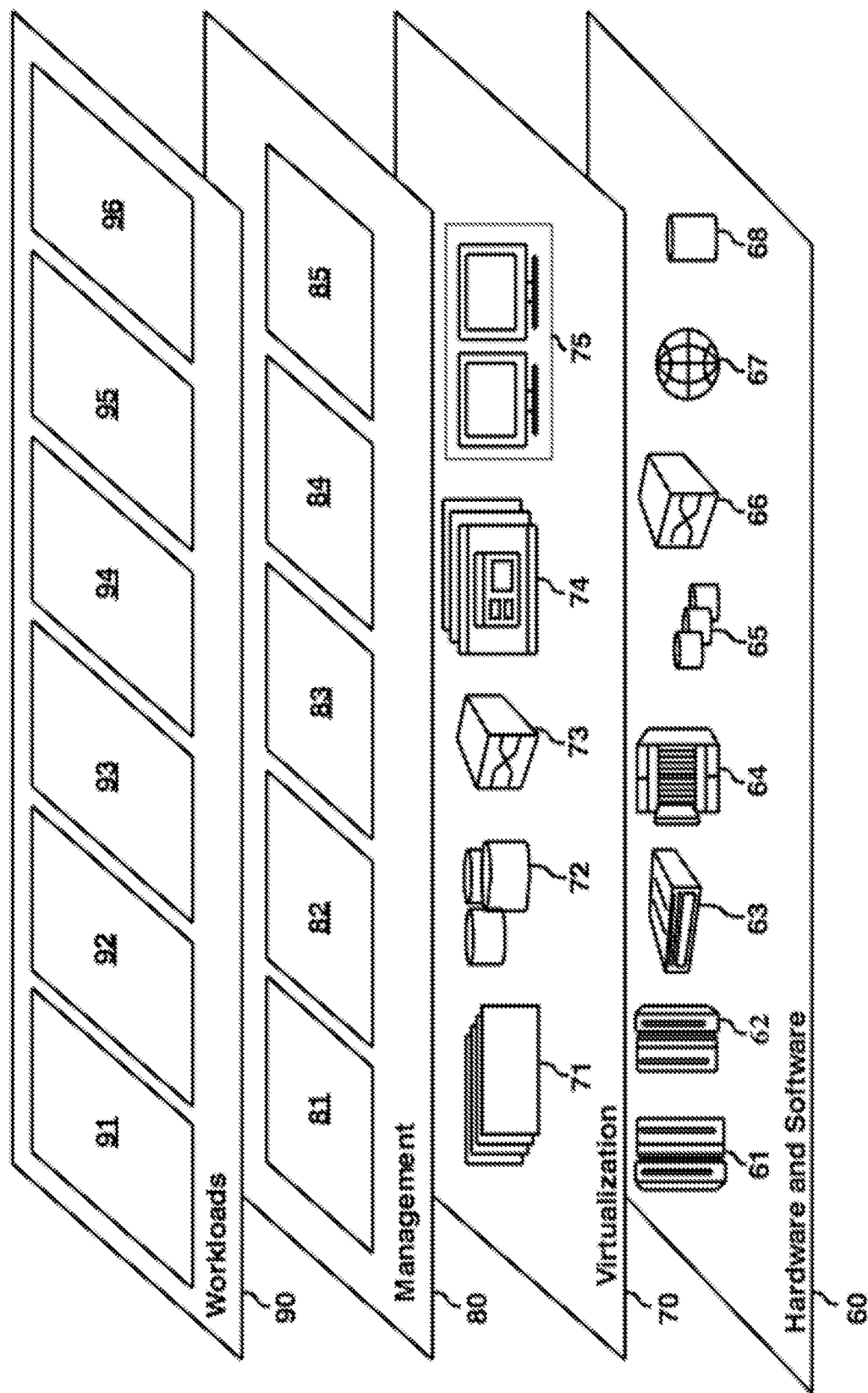
FIG. 5 depicts abstraction model layers in accordance with an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and microservice deployment system 96. Microservice deployment system 96 may relate to determining the optimal target location(s) for deployment of microservices (MS) in a hybrid multi-cloud computing environment using bipartite graph matching.

The descriptions of the various embodiments of the present invention have been presented for purposes of illustration, but are not intended to be exhaustive or limited to the embodiments disclosed. The terminology used herein was chosen to explain the principles of the one or more embodiments, the practical application or technical improvement over technologies found in the marketplace, or to enable others of ordinary skill in the art to understand the embodiments. Various modifications, additions, substitutions, and the like will be apparent to those of ordinary skill in the art without departing from the scope and spirit of the invention, as defined in the following claims.

What is claimed is:

1. A computer-implemented method for deployment of microservices within a shared pool of configurable computing resources, the method comprising:
    creating a dependency map for a plurality of microservices of an application deployed on the shared pool of configurable computing resources;
    identifying attributes, with associated values, for each microservice of the plurality of microservices;
    identifying eligible deployment locations within the shared pool of configurable computing resources;
    creating a modified bipartite graph based on the plurality of microservices and the identified eligible deployment locations, the modified bipartite graph including a first side of nodes comprising microservices from the dependency map and a second side of nodes comprising the eligible deployment locations, wherein the first side of nodes includes edges between the microservices and the second side of nodes comprises edges between the eligible deployment locations;
    applying bipartite matching to the shared pool of configurable computing resources based on the created modified bipartite graph; and
    based on the applied bipartite matching, relocating one or more microservices, of the plurality of microservices, within the shared pool of configurable computing resources.

2. The computer-implemented method of claim 1, wherein the shared pool of configurable computing resources comprises a hybrid multi-cloud computing environment, and wherein the identified attributes for each microservice are based, in part, on historical data and include at least one of a prediction of location based user spread map for various time periods, a prediction of processing load resulting from user requests and/or other microservices of the plurality of microservices for various periods of time, a prediction of resource availability at one or more prospective target deployment locations for various periods of time, a prediction of network latency among all deployment locations for various periods of time, and a list of compliant prospective target deployment locations, and wherein identifying eligible deployment locations further comprises identifying attributes, with associated values, for the eligible deployment locations.

3. The computer-implemented method of claim 1, further comprising:
    transforming the dependency map into a time series based graph with the plurality of microservices as a plurality of vertices and dependencies between the plurality of microservices as the edges between the microservices, wherein each edge of the edges between the microservices has an associated value which represents the network latency between vertices of the plurality of vertices.

4. The computer-implemented method of claim 1, further comprising:
    in response to a triggering event, re-applying bipartite matching to the shared pool of configurable computing resources, wherein the triggering event includes at least one of a change in user distribution, a change in application performance, a change in network latency between microservices of the plurality of microservices, a change in deployment location of microservices of the plurality of microservices, and a change in processing load on microservices of the plurality of microservices, and wherein the re-applying bipartite matching comprises identifying one or more eligible deployment locations for each microservice of the plurality of microservices and/or relocating one or more microservices within the shared pool of configurable computing resources.

5. The computer-implemented method of claim 3, wherein the first set of nodes comprises the time series based graph, and wherein edges between nodes of the first set of nodes and nodes of the second set of nodes have an associated network latency value.

6. The computer-implemented method of claim 1, wherein the applied bipartite matching results in an identified allocation of a microservice, of the plurality of microservices, to an eligible deployment location, of the identified eligible deployment locations, based on a determined network latency value for the identified allocation.

7. The computer-implemented method of claim 1, further comprising:
    determining, for each microservice of the plurality of microservices, a relative criticality value as a function of criticality of application and relative criticality of the microservice within the context of the application, wherein criticality of application is defined by configuration data, and wherein relative criticality of the microservice within the context of the application is assigned manually or calculated based on analysis of application historical data.

8. A computer program product for deployment of microservices within a shared pool of configurable computing resources, the computer program product comprising one or more computer readable storage media having program instructions collectively stored on the one or more computer readable storage media, the program instructions executable to cause a computing device to:
    create a dependency map for a plurality of microservices of an application deployed on the shared pool of configurable computing resources;
    identify attributes for each microservice of the plurality of microservices;
    identify eligible deployment locations within the shared pool of configurable computing resources;
    create a modified bipartite graph based on the plurality of microservices and the identified eligible deployment locations, the modified bipartite graph including a first side of nodes comprising microservices from the dependency map and a second side of nodes comprising the eligible deployment locations, wherein the first side of nodes includes edges between the microservices and the second side of nodes comprises edges between the eligible deployment locations;
    apply bipartite matching to the shared pool of configurable computing resources based on the created modified bipartite graph; and based on the applied bipartite matching, relocate one or more microservices, of the plurality of microservices, within the shared pool of configurable computing resources.

9. The computer program product of claim 8, wherein the shared pool of configurable computing resources comprises a hybrid multi-cloud computing environment, and wherein the identified attributes for each microservice are based, in part, on historical data and include at least one of a prediction of location based user spread map for various time periods, a prediction of processing load resulting from user requests and/or other microservices of the plurality of microservices for various periods of time, a prediction of resource availability at one or more prospective target deployment locations for various periods of time, a prediction of network latency among all deployment locations for various periods of time, and a list of compliant prospective target deployment locations, and wherein the identifying the eligible deployment locations comprises identifying attributes, with associated values, for the eligible deployment locations.

10. The computer program product of claim 8, wherein the program instructions are further executable to cause the computing device to:
transform the dependency map into a time series based graph with the plurality of microservices as a plurality of vertices and dependencies between the plurality of microservices as the edges between the microservices, wherein each edge of the edges between the microservices has an associated value which represents the network latency between vertices of the plurality of vertices.

11. The computer program product of claim 8, wherein the program instructions are further executable to cause the computing device to:
in response to a triggering event, re-apply bipartite matching to the shared pool of configurable computing resources, wherein the triggering event includes at least one of a change in user distribution, a change in application performance, a change in network latency between microservices of the plurality of microservices, a change in deployment location of microservices of the plurality of microservices, and a change in processing load on microservices of the plurality of microservices, and wherein the re-applying the bipartite matching comprises identifying one or more eligible deployment locations for each microservice of the plurality of microservices and/or relocate one or more microservices within the shared pool of configurable computing resources.

12. The computer program product of claim 10, wherein the first set of nodes comprises the time series based graph, and wherein edges between nodes of the first set of nodes and nodes of the second set of nodes have an associated network latency value.

13. The computer program product of claim 8, wherein the applied bipartite matching results in an identified allocation of a microservice, of the plurality of microservices, to an eligible deployment location, of the identified eligible deployment locations, based on a determined network latency value for the identified allocation.

14. The computer program product of claim 8, wherein the program instructions are further executable to cause the computing device to:
determine, for each microservice of the plurality of microservices, a relative criticality value as a function of criticality of application and relative criticality of the microservice within the context of the application, wherein criticality of application is defined by configuration data, and wherein relative criticality of the microservice within the context of the application is assigned manually or calculated based on analysis of application historical data.

15. A computer system for deployment of microservices within a shared pool of configurable computing resources, the computer system comprising:
a processor, a computer readable memory, one or more computer readable storage media, and program instructions collectively stored on the one or more computer readable storage media, the program instructions executable to:
create a dependency map for a plurality of microservices of an application deployed on the shared pool of configurable computing resources;
identify attributes for each microservice of the plurality of microservices;
identify eligible deployment locations within the shared pool of configurable computing resources;
create a modified bipartite graph based on the plurality of microservices and the identified eligible deployment locations, the modified bipartite graph including a first side of nodes comprising microservices from the dependency map and a second side of nodes comprising the eligible deployment locations, wherein the first side of nodes includes edges between the microservices and the second side of nodes comprises edges between the eligible deployment locations;
apply bipartite matching to the shared pool of configurable computing resources based on the created modified bipartite graph; and
based on the applied bipartite matching, relocate one or more microservices, of the plurality of microservices, within the shared pool of configurable computing resources.

16. The computer system of claim 15, wherein the shared pool of configurable computing resources comprises a hybrid multi-cloud computing environment, and wherein the identified attributes for each microservice are based, in part, on historical data and include at least one of a prediction of location based user spread map for various time periods, a prediction of processing load resulting from user requests and/or other microservices of the plurality of microservices for various periods of time, a prediction of resource availability at one or more prospective target deployment locations for various periods of time, a prediction of network latency among all deployment locations for various periods of time, and a list of compliant prospective target deployment locations, and wherein the identifying the eligible deployment locations comprises identifying attributes, with associated values, for the eligible deployment locations.

17. The computer system of claim 15, wherein the program instructions are further executable to cause the computing device to:
transform the dependency map into a time series based graph with the plurality of microservices as a plurality of vertices and dependencies between the plurality of microservices as the edges between the microservices, wherein each edge of the edges between the microservices has an associated value which represents the network latency between vertices of the plurality of vertices.

18. The computer system of claim 15, wherein the program instructions are further executable to cause the computing device to:

in response to a triggering event, re-apply bipartite matching to the shared pool of configurable computing resources comprises, wherein the triggering event includes at least one of a change in user distribution, a change in application performance, a change in network latency between microservices of the plurality of microservices, a change in deployment location of microservices of the plurality of microservices, and a change in processing load on microservices of the plurality of microservices, and wherein the re-applying the bipartite matching comprises identifying one or more eligible deployment locations for each microservice of the plurality of microservices and/or relocate one or more microservices within the shared pool of configurable computing resources comprises.

19. The computer system of claim 17, wherein the first set of nodes comprises the time series based graph, and wherein edges between nodes of the first set of nodes and nodes of the second set of nodes have an associated network latency value.

20. The computer system of claim 15, wherein the applied bipartite matching results in an identified allocation of a microservice, of the plurality of microservices, to an eligible deployment location, of the identified eligible deployment locations, based on a determined network latency value for the identified allocation.

\* \* \* \* \*